Jan. 21, 1969    L. B. LEONARD    3,423,304
LEAK STRUCTURE AND METHOD FOR PRODUCING SAME
Filed Nov. 17, 1964    Sheet 1 of 3

INVENTOR.
LYNN B. LEONARD
BY
Thomas L. Peterson
ATTORNEY

Jan. 21, 1969 L. B. LEONARD 3,423,304
LEAK STRUCTURE AND METHOD FOR PRODUCING SAME
Filed Nov. 17, 1964 Sheet 3 of 3

INVENTOR.
LYNN B. LEONARD
BY
Thomas L. Peterson
ATTORNEY

United States Patent Office 3,423,304
Patented Jan. 21, 1969

3,423,304
LEAK STRUCTURE AND METHOD FOR PRODUCING SAME
Lynn B. Leonard, Fullerton, Calif., assignor to Beckman Instruments, Inc., a corporation of California
Filed Nov. 17, 1964, Ser. No. 411,793
U.S. Cl. 204—195                                            18 Claims
Int. Cl. B01k 3/04

ABSTRACT OF THE DISCLOSURE

The specification discloses a leak structure for a liquid junction of a salt bridge tube such as used in a reference electrode for ion potential measurements and the method of making the leak structure. The structure comprises a salt bridge tube having an opening plugged with a nonconductive material which has essentially the same coefficient of thermal expansion as the salt bridge tube, the plug of nonconductive material being secured within the opening to form a leak passage. In the method of making the leak structure either the tube or the plug is heated to a molten state to allow the plug to be received and secured. By having material of essentially the same coefficient of expansion, changes in temperature of a sample solution into which the salt bridge tube may be placed does not alter the size of the leak passage; hence, the rate of flow of a salt bridge solution is not disturbed. To ensure against fusion of the plug to the tube a film of plastic may be used therebetween during the making of the structure.

---

This invention relates generally to an article incorporating minute passages between spaced zones and to a method for making such an article and, in particular, to a leak structure for a liquid junction of a salt bridge tube such as is used in reference electrodes for ion potential measurements in solutions and the method of making such a leak structure.

In electrochemical measurements a reference electrode is commonly employed in conjunction with a measuring electrode, such as a glass electrode, with both electrodes immersed in a solution, whereby the potential difference between the two electrodes is a function of the concentration of a specific ion in the solution. A typical example is the conventional pH meter used for measuring hydrogen ion concentration in solutions.

A reference electrode ordinarily comprises an internal half cell structure supported within a tube containing a salt solution, the tube of salt solution being known as a salt bridge. Electrical connection between the salt solution and the sample or test solution is made by liquid contact via a suitably formed aperture or passage in the tube, generally referred to as a leak structure. Sometimes the entire unit consisting of the internal half cell structure, the tube, the salt solution and the leak structure is referred to as a half cell; however, for the present specification, the entire unit will be referred to as a reference electrode.

Three United States patents which disclose leak structures related to that of the present invention are Patent No. 2,345,498 to Perley, Patent No. 2,705,220 to Arthur and Patent No. 2,927,887 to Proctor. The Perley patent shows a leak structure formed by a crack in a salt bridge tube. The crack is formed by providing two different glasses of different coefficient of thermal expansion which crack upon cooling after the glasses have been heated. The patent to Arthur discloses an inert metal rod sealed into an opening in a salt bridge tube. Proctor discloses a plastic plug sealed into an opening in a salt bridge tube. Although each of these leak structures are suitable for many applications, they have certain disadvantages, and, most particularly, the disadvantage that the plugs in each of these leak structures have a higher coefficient of thermal expansion than the salt bridge tube into which they are sealed. Consequently, when the temperature of a sample increases the plug tends to expand and alter the flow rate of the salt solution through the leak structure thereby altering the characteristics of the reference electrode. Furthermore, the Arthur and Perley leak structures are somewhat fragile whereas the Proctor leak structure is highly subject to corrosion by certain acids or bases and by certain organic solvents.

What is needed, therefore, and comprises the principal object of the present invention is a leak structure which provides a constant flow of salt solution over a wide range of temperatures and which is inexpensive and durable.

Another object of the present invention is to provide a leak structure for a salt bridge tube or the like which is rugged, provides a slow flow of salt solution through the structure, has a low electrical resistance and which is easy to manufacture with highly reproducible characteristics.

Still a further object of the invention is to provide a leak structure formed of a single material, preferably glass.

According to a principal aspect of the present invention, a leak structure is formed for a salt bridge tube of a reference electrode or the like by providing a wall of electrically nonconductive material with an opening therein and a plug of a material having essentially the same coefficient of thermal expansion as the wall. Either the plug or the wall of the tube adjacent the opening is then heated to a molten state. Thereafter, the plug is forced into said opening. Upon cooling of the plug and the wall adjacent to the plug, a minute passage is provided therebetween which permits the flow of solution between opposite sides of the wall and, thus, is suitable for a leak structure for salt bridge tubes or the like. Since the coefficient of thermal expansion of the plug and wall are essentially the same, changing temperatures of a sample do not alter the size of the minute passage and, therefore, a constant flow of solution may pass through the leak structure over a wide temperature range. Furthermore, since both the plug and wall are formed of nonconductive material, neither are subject to corrosion from most acids or bases. Also, the structure has been found to be extremely rugged and has a slow flow rate so that renewal of the salt solution in a salt bridge tube is required only after long intervals of time.

According to another aspect of the present invention, a substance is provided either in the opening in the wall of nonconductive material or on the plug which is capable of preventing the fusion of the wall to the plug when the latter is forced into the opening. This ensures that the leak structure will not be closed off during the formation of the plug in the opening of the wall and permits the easy manufacture of leak structures without the requirement of a high degree of manual dexterity and skill.

Other objects, aspects and advantages will become apparent from the following description taken in connection with the accompanying drawings wherein.

Figure 1:
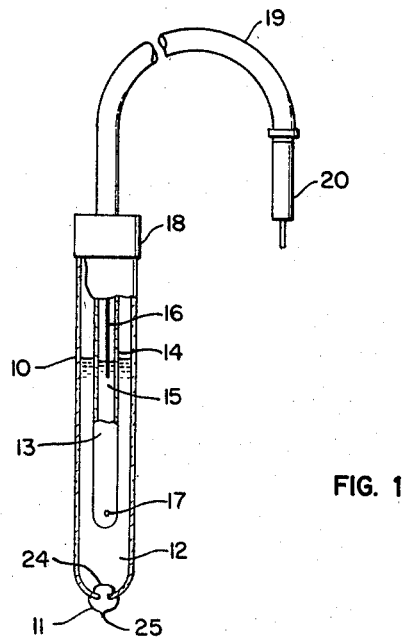
FIG. 1 is a side view, partly in section, showing a reference electrode incorporating the leak structure of one embodiment of the invention.

The leak structure is described herein as used with a typical reference electrode for a pH meter. A tube 10, FIG. 1, ordinarily of glass, is closed at the lower end with a plug 11 and contains a salt solution 12. An internal half cell 13 is positioned within the tube and is partially immersed in the salt solution. The particular half cell illustrated herein is a silver-silver chloride half cell and comprises a tube 14 with a silver chloride solution 15 and a silver wire 16 coated with silver chloride immersed in the solution 15. A small opening 17 is provided in the tube 14 for fluid communication with the solution 12. The electrode structure is closed with a cap 18 and a cable 19 provides an electrical connection between the wire 16 and a connector 20.

In one embodiment of the invention, the leak structure comprises the plug 11 which is positioned in an opening in the end of salt bridge tube 10. The plug 11 cooperates with the sides of the walls of the opening to provide a leak path for solution 12. The tube 10 is formed of non-conductive material and the plug is formed of a non-conductive material having essentially the same coefficient of thermal expansion as the material of the tube 10. The term "essentially" as used in the specification and claims is understood to mean that the coefficient of thermal expansion of the plug 11 and tube 10 of the finished product are such that over a wide range of temperatures under which a reference electrode is normally used the difference in thermal expansion of the materials is not sufficient to alter the size of the minute annulus provided between the wall 10 of the salt bridge tube and the plug 11. Preferably, the tube 10 and the plug 11 are formed of glass of essentially the same composition and thus having the same coefficient of thermal expansion. It has been found that glass made with Corning "Pyrex" glass is quite suitable for use in the present invention although it is understood that any glass or other material may be used depending upon the intended use for the leak structure.

Figure 2:
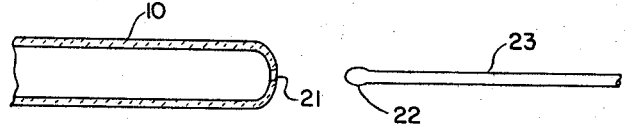
FIGS. 2-4 show three steps for making the leak structure illustrated in FIG. 1.
Figure 3:
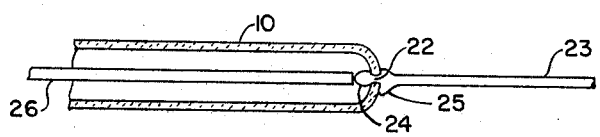
Figure 4:
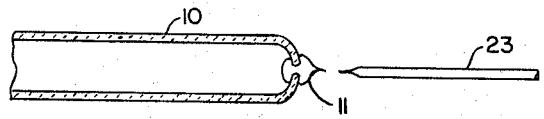

Referring now to FIGS. 2–4, the leak structure is formed by providing a molten gob 22 on the end of a glass rod 23 by melting a portion of the end of the rod. The gob must be larger than the opening 21 in the tube. The tube 10 is maintained in a cool condition, room temperature being permissible, and the gob 22 of molten glass is quickly forced into the opening 21 in the end of the glass tube as seen in FIG. 3. When the gob is forced into the opening 21, a pair of flanges 24 and 25 on the inside and outside of the tube, respectively, are formed which retain the plug tightly within the opening and a minute annular passage is formed between the wall of the tube and the plug through which a salt solution or the like may pass.

Occasionally, it is advantageous to provide some means of applying pressure to the portion of the glass gob 22 that extends into the interior of the tube 10. This pressure may be provided by applying a high pressure of gas such as air into the open end of the tube 10 which tends to compress the end of the gob 22 and assist in the formation of the inner flange 24. An additional means by which pressure may be applied is by providing a carbon rod 26 centrally positioned in the tube 10 as seen in FIG. 3 so that when the gob of molten glass 22 is forced into the opening 21, the end of the gob will strike the carbon rod and, consequently, the reactive force will compress the end of the gob into the flange 24. Once the plug 11 is formed into the opening 21 of the glass tube 10, the rod 23 may be drawn out and broken off as shown in FIG. 4. Thereafter, the plug 11 and the area of the tube 10 adjacent to the opening 21 which is heated by the plug are allowed to cool. This cooling may be accomplished by merely leaving the parts at room temperature.

Figure 5:
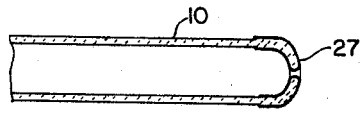
FIGS. 5 and 6 show the salt bridge tube covered with different substances which prevent the fusion of the tube to a gob of molten glass.

As a practical matter, the above described method requires a great deal of skill and close temperature control inasmuch as the wall of the glass tube 10 must be kept cool and the molten gob of glass 22 must be quickly forced into the opening 21 so that there will be no fusion between the two glass members. In fact, occasionally a fusion of the plug to the glass tube 10 results and, consequently, the leak path is closed off. Therefore, another feature of the present invention is to provide a further step in the method which prevents the fusion of the molten gob of glass 22 to the walls of the glass tube 10 when the former is forced into the opening 21. This fusion may be prevented by providing a substance between the plug 11 and the wall of the glass tube 10 which prevents any fusion from taking place. This may be accomplished by several means and it is to be understood that other equivalent means used for this purpose fall within the scope of this invention. One of such means is the coating of the end of the glass tube 10 and the opening 21 with a substance such as a wax or grease which is indicated by numeral 27 in FIG. 5. This coating may be provided by rubbing the outer end of the glass tube 10 and the inside thereof with the wax or grease so as to cover the opening 21 or, preferably, by dipping the end of the tube 10 into a pool of wax or grease. It has been found that beeswax and silicone grease are successful in preventing the fusion of the molten gob of glass 22 to the glass tube 10 when the gob is forced into the opening 21.

Figure 6:
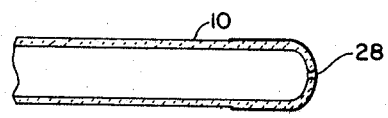

Another means for obtaining the same result is the provision of a thin film of plastic 28 over the end of the glass tube as shown in FIG. 6. It has been found that when the molten gob of glass 22 is forced into the opening 21, fusion of the two glass members is prevented by the provision of this plastic film. It is believed that the fusion is prevented by the vaporizing of the plastic film when contacted with the molten gob of glass 22 and the deposit of the vapor on the wall of the opening 21. A suitable plastic which may be used is Du Pont "Teflon" resin. By providing a grease, wax or plastic film as described above, a high degree of success is obtained in quickly, easily and reproducibly forming leak structures of the present invention.

When the wax, grease, film of "Teflon" or any other substance is used on the end of the tube to prevent fusion of the plug 11 to the tube 10, some of the material will remain between the surface of the plug 11 and the wall of the opening 21 and also on the inside and outside of the end of the glass tube 10. This material may be readily removed by annealing the glass structure to burn off the remainder of the substance. For glass of "Pyrex," the annealing temperature is around 550° C.

Figure 7:
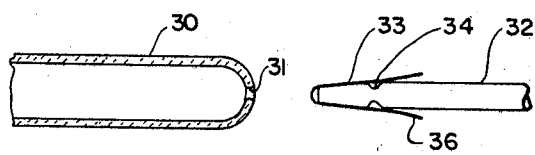
FIGS. 7-9 show three steps of an alternative method of forming the leak structure of the invention.
Figure 8:
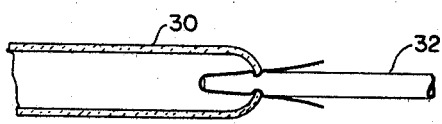
Figure 9:
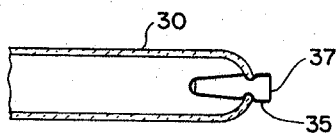

An alternative method of forming the leak structure of the present invention is illustrated in FIGS. 7 to 9. In this method, rather than providing a molten gob of glass which is forced into the open end of a glass tube, the plug for the leak structure is kept cool while the wall of the tube adjacent the opening is heated to a molten state. The method may be more readily understood by referring to FIGS. 7 to 9 which show a glass tube 30 of non-conductive material having an opening 31 in one end thereof and a bar 32 of a material having essentially the same coefficient of thermal expansion as the material of the tube 30. As in the prior method, preferably the materials of the bar 32 and tube 30 are glass having essentially the same composition and, therefore, the same coefficient of thermal expansion. The bar 32 is larger than the opening 31 and is tapered at its forward end 33. It also has an annular groove 34 behind the tapered portion 33. The forward end of the bar provides the structure for the finished plug 35 shown in FIG. 9. As in the above described method, it is preferable to have a substance over the front end of the bar 32 which is capable of preventing fusion of the glass bar 32 to the glass tube 30. This substance is illustrated by way of example in FIG. 7 as being a plastic sheet 36 although it could be a wax, grease or any other suitable substance.

In order to form the leak structure, the wall of the glass tube 30 adjacent the opening 31 is heated to a molten state and, thereafter, the glass bar 32 and glass tube 30 are moved relative to one another so that the front portion of the bar 32 is forced into the opening 31. Due to the molten condition of the wall of the tube 30, the wall will expand when the tapered portion 33 of the bar 32 is forced into the opening. Once the bar reaches the position where the wall of the tube 30 registers with the groove 34, a molten portion of the wall will fill up the groove 34 as shown in FIG. 8. The assembly is then allowed to cool and, thereby, a minute passage between the wall of the glass tube 30 and the surface of the groove 34 is formed. Thereafter, the bar 32 may be ground away or broken off as shown at 37 in FIG. 9 to finish the leak structure. As in the prior methods, the substance used on the bar 32 to prevent fusion of the plug 35 to the tube 30 may be removed by annealing the glass structure.

Figure 10:
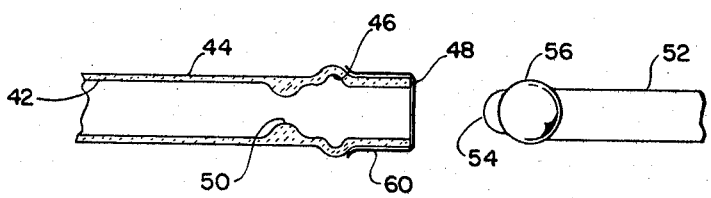
FIGS. 10-12 show three steps of forming a modified form of the leak structure of the invention.
Figure 11:
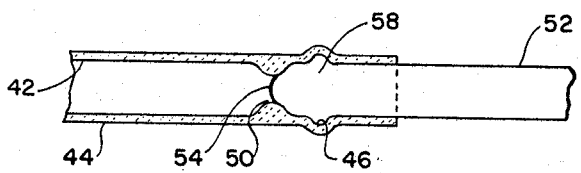
Figure 12:
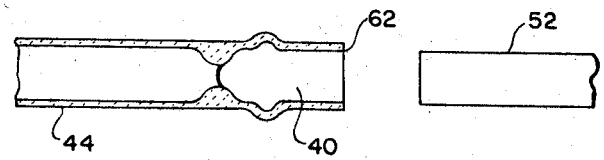

A further modification of the novel leak structure of the present invention and the method for making the same is illustrated in FIGS. 10 to 12. As best seen in FIGS. 10 and 12, the leak structure comprises a plug 40 which fills a passage 42 in a tube 44. Although the member into which the plug 40 is mounted is illustrated as a tube 44, it is to be understood that the plug 40 could also be mounted in an opening through a wall rather than a tube. The method for forming the leak structure in FIG. 12 may best be understood by referring to FIGS. 10 and 11 which illustrate the tube 44 which is provided with an annular groove 46 spaced behind the open end 48 of the tube and an annular restriction 50 positioned behind the groove 36. The restriction 50 and groove 46 may be formed by any conventional glass-making techniques. The material from which the plug 40 is formed is provided by a bar 52 of a nonconductive material such as glass. As in the above-described leak structures, the material of the bar 52 and the tube 44 must have essentially the same coefficient of thermal expansion and preferably are glass having essentially the same composition.

In order to form the plug 40 in the tube 44, the area just behind the end 54 of the bar 52 is formed into a molten gob 56 by applying heat thereto. The molten gob is forced into the passage 42 in the tube 44 as shown in FIG. 11 until the end 54 of bar 52 abuts against the restriction 50. Additional pressure against the bar 52 causes the molten portion of the bar to become piled-up into the end of the tube whereby the molten gob fills the annular groove 46 in the tube thereby forming a flange 58 which retains the plug in the tube 44. As in the above-described methods, it is preferable to have a substance between the gob 56 and the tube 44 which prevents fusion of the glass members. This substance may be either a grease or wax coating on the inner surface of the tube 44 or a plastic sheet 60 disposed over the end 48 of the tube prior to the insertion of the molten gob 56 into the tube. After the bar and molten gob have cooled, the bar 52 may be separated from the plug 40 as shown in FIG. 12 thus leaving a flat end for the tube 44. This structure has some advantages over those disclosed in FIGS. 1 and 9 in that the leak path through the leak structure is longer thus permitting a slower leak of liquid through the leak structure. Furthermore, the end 62 of the leak structure may be ground away to any desired length thus permitting a desired leak flow rate through the leak structure and electrical resistance to be obtained.

Figure 13:
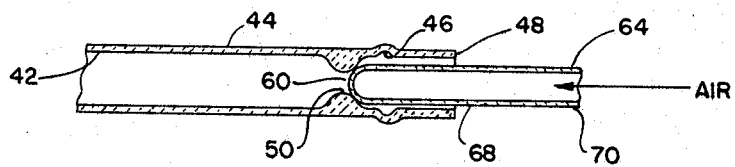
FIGS. 13-15 show three steps of forming still a further embodiment of the invention particularly adapted for use in a combination glass-reference electrode.
Figure 14:
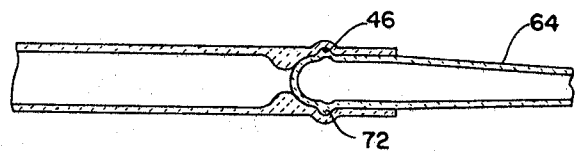
Figure 15:
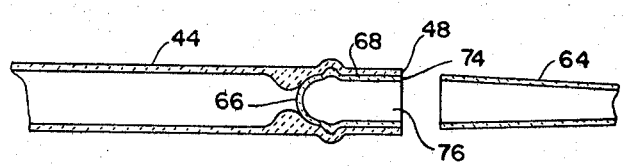

Still a further modification of the leak structure of the present invention and method for making the same is illustrated in FIGS. 13 to 15 which show a tube 44, as in FIGS. 10 to 12, and a tube 64. The tube 64 is closed at its forward end 66 by heating the end of the tube. The tube 64 and member 44 have the same coefficient of thermal expansion and preferably are glass having the same composition as in the prior embodiments. In this embodiment, the front portion 68 of the tube 64 is heated to a molten state and then the tube is positioned in the open end 48 of tube 44 as seen in FIG. 13. Air under pressure is then delivered to the rear end 70 of the tube 64 to expand the molten portion 68 against the inner walls of the end of the tube 44 as shown in FIG. 14. The expansion of the tube 64 in tube 44 causes a flange 72 to be formed which interlocks with the groove 46 in the tube 44. Thereafter, the tube 64 is cut away from tube 44 as shown in FIG. 15 thus leaving a surface 74 which is flush with the end 48 of tube 44. Thus, by this method there is produced a leak structure wherein the leak path is provided between a section of a closed tube 68 and a surrounding tube 44 whereby a cavity 76 is provided in the end of the leak structure. As in the previous embodiments, either grease or a plastic sheet may be disposed over the end 48 of the tube 44 prior to inserting the tube 64 into the open end of tube 44 so as to prevent fusion of the two pieces of glass during assembly.

Figure 16:
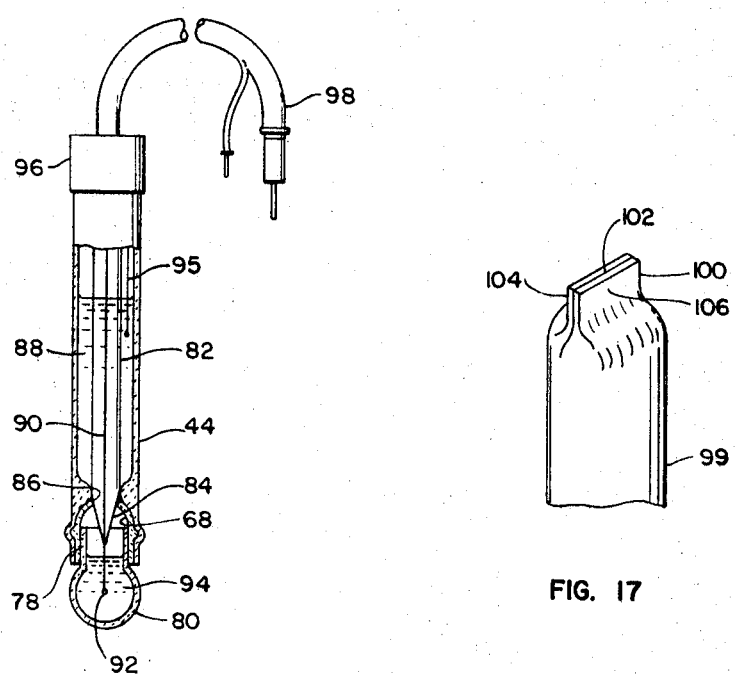
FIG. 16 shows a side view, partly in section, of a combination glass-reference electrode embodying the invention in FIGS. 13–15.

The leak structure illustrated in FIG. 15 is particularly useful when it is desired to construct a combination glass-reference electrode as illustrated in FIG. 16. The electrode in FIG. 16 comprises the tube 44 having the hollow plug 68 in the lower end thereof with a glass tube 78 cemented in the cavity 76 and having an ion sensitive bulb 80 depending from the lower end of the tube 78. A glass rod 82 is centrally mounted in the tube 44 and has its end 84 extending through the restricted portion 50 of tube 44 and through an opening 86 formed in the end 66 of the glass tube 68. The rod 82 is sealed to the walls of the opening 86 by a suitable cement or the like so as to prevent flow of a salt solution 88 in the tube 44 into the interior of the ion sensitive bulb 80. The rod 82 has a conductor 90 extending longitudinally therethrough and terminating in an internal half cell 92 contacting a solution 94 in the bulb 80. A reference half cell 95 is immersed in the salt solution 88 to provide the reference electrode structure for the combination glass-reference electrode. A cap 96 closes the upper end of the tube 44 while a conductor 98 is connected to the reference half cell 95 and the conductor 90. It can be appreciated from the structure described herein and illustrated in FIG. 16 that a novel combination electrode is provided wherein a leak is provided for the salt solution in the tube 44 outside of the electrode through the minute passage provided between the outer surface of the tube 68 and the inner wall of the end of the tube 44.

Figure 17:
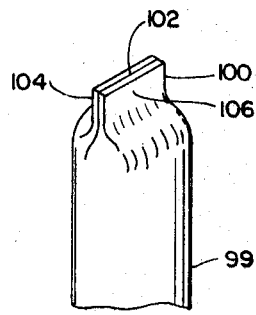
FIG. 17 shows still a further embodiment of the leak structure of the present invention.

Still a further modification of the present invention is shown in FIG. 17 wherein a leak structure is formed completely of a single material without the requirement of a separate plug as in the previous embodiments of the invention. In this embodiment, a glass tube 99 is restricted at one end 100 and has a slot 102 between the flat walls 104 and 106 of the restricted portion 100. The leak path is provided through the slot 102 between the flat portions 104 and 106 at the end of the tube 99. This structure is formed be heating the end of a glass tube to a molten state and then pinching the end of the tube into the configuration shown in FIG. 17. As in the previous embodiments, it is preferable to provide a coating of a material which will prevent fusion of the glass when it is compressed. This may be done by dipping the end of the tube 99 in a grease or wax so that when the molten end of the tube is pinched the walls 104 and 106 will not fuse together.

In order to prepare the leak structure of the invention for use in a reference electrode, the end of the salt bridge tube with the plug is boiled in the salt solution which is to be utilized in the salt bridge tube, such solution normally being a buffered solution of KCl. The boiling of the leak structure tends to flush out the leak path and charge it with KCl.

Leak structures formed in accordance with the teachings of this invention have been found to be tighter and, thus, more rugged than any of the conventional leak structures known heretofore. They may be readily manufactured with a minimum amount of skill, and provide an extremely slow flow rate so that the salt solution need not be replaced often. Furthermore, since the leak structure is formed of a nonconductive material, namely glass, it is not subject to any corrosion by most acids or bases or any other corrosive agents in a sample in contrast, for example, to the plastic plug leak structure described in the aforementioned patent to Proctor.

Furthermore, one of the most important advantages of the invention is that the size of the minute annulus or passage formed by the leak structure of the invention does not change even over a wide temperature range. This is because the entire structure has the same coefficient of thermal expansion.

Although several embodiments of the invention have been disclosed herein for purposes of illustration, it will be understood that various changes can be made in the form, details and arrangement and proportions of the various parts in such embodiments without departing from the spirit and scope of the invention as defined by the appended claims.

What is claimed is:

1. In a leak structure for a liquid junction of a salt bridge tube and the like, the combination of:
   a wall of nonconductive material having an opening therein;
   a plug positioned in said opening and extending therethrough;
   said plug having integral flanges at each end thereof engaging each of the opposite sides of said wall to retain said plug in said opening, said plug cooperating with said wall to provide a minute passageway between opposite sides of said wall; and
   said plug being formed of a nonconductive material having essentially the same coefficient of thermal expansion as the material of said wall.

2. In a leak structure for a liquid junction of a salt bridge tube and the like, the combination of:
   a tube of nonconductive material having a passage therethrough;
   an annular groove in said passage adjacent one end of said tube and said passage having a restriction behind said groove;
   a plug positioned in said passage between said restriction and said one end of said tube, said plug having a flange filling said groove;
   said plug cooperating with the inner surface of said tube to provide a minute passageway through said tube; and
   said plug being formed of a nonconductive material having essentially the same coefficient of thermal expansion as the material of said tube.

3. A leak structure as set forth in claim 2 wherein said plug has a cavity therein opening through the end thereof adjacent said one end of said tube.

4. In a leak structure for a liquid junction of a salt bridge tube and the like, the combination of:
   a tube of nonconductive glass;
   said tube being pinched at one end thereof to provide a pair of flat walls having a minute passageway therebetween, said minute passageway communicating the interior and exterior of said tube.

5. A method of making a leak structure for a liquid junction of a salt bridge tube and the like, including the steps of:
   providing a wall member of nonconductive material having an opening therein;
   providing a plug member of nonconductive material having essentially the same coefficient of thermal expansion as the material of said wall member, said plug member being larger than said opening;
   heating one but not the other of said members to a molten state; and
   forcing said plug member into said opening in said wall member whereby said members, when cooled, cooperate to provide a minute passage between opposite sides of said wall member.

6. A method of making a leak structure for a liquid junction of a salt bridge tube and the like, including the steps of:
   providing a wall member of nonconductive material having an opening therein;
   providing a plug member of nonconductive material having essentially the same coefficient of thermal expansion as the material of said wall member, said plug member being larger than said opening;
   heating one but not the other of said members to a molten state; and
   forcing said plug member into said opening in said wall member from one side of said wall member to an extent sufficient to extend through to the other side of said wall member whereby said members, when cooled, cooperate to provide a minute passage between opposite sides of said wall member.

7. A method as set forth in claim 5 wherein said wall member and said plug member are made of glass of essentially the same composition.

8. A method of making a leak structure for a liquid junction of a salt bridge tube and the like, including the steps of:
   providing a wall member of nonconductive material having an opening therein;
   providing a plug member of nonconductive material having essentially the same coefficient of thermal expansion as the material of said wall member, said plug member being larger than said opening;
   heating one but not the other of said members to a molten state;
   providing a film on the other of said members, said film being a substance capable of preventing the fusion of said one member to said other member; and
   forcing said plug member into said opening in said wall member whereby said members, when cooled, cooperate to provide a minute passage between opposite sides of said wall member.

9. A method as set forth in claim 8 including the additional step of annealing said tube and plug to burn off any of said substance remaining between said plug and said wall.

10. A method of making a leak structure for a liquid junction of a salt bridge tube and the like, including the steps of:
    providing a wall of nonconductive material having an opening therein;
    providing a gob of molten nonconductive material having essentially the same coefficient of thermal expansion as the material of said wall, said gob being larger than said opening; and
    forcing said gob into said opening to an extent sufficient to provide a plug having a pair of integral flanges engaging each of the opposite sides of said wall adjacent to said opening whereby said plug and said wall, when cooled, cooperate to provide a minute passageway between opposite sides of said wall.

11. A method of making a leak structure for a liquid junction of a salt bridge tube and the like, including the steps of:
    providing a wall of nonconductive material having an opening therein;
    providing a gob of molten nonconductive material having essentially the same coefficient of thermal expansion as the material of said wall, said gob being larger than said opening;
    forcing said gob into said opening from one side of said wall to an extent sufficient to extend through to the other side of said wall and to provide an integral flange on said one side of said wall; and applying pressure to the portion of said gob on said other side of said wall to provide a second flange whereby a plug is provided in said opening having a pair of flanges engaging each of the opposite sides of said wall adjacent said opening and whereby said wall and said plug, when cooled, cooperate to provide a minute passageway between opposite sides of said wall.

12. A method of making a leak structure for a liquid junction of a salt bridge tube and the like, including the steps of:
providing a wall member of nonconductive material having an opening therein;
providing a plug of nonconductive material having essentially the same coefficient of thermal expansion as the material of said wall, said plug being larger than said opening;
heating the portion of said wall adjacent to said opening to a molten state; and
forcing said plug into said opening whereby said plug and said wall, when cooled, cooperate to provide a minute passageway between opposite sides of said wall.

13. A method of making a leak structure for a liquid junction of a salt bridge tube and the like, including the steps of:
providing a wall member of nonconductive material having an opening therein;
providing a plug of nonconductive material having essentially the same coefficient of thermal expansion as the material of said wall, said plug being larger than said opening and having an annular groove in its surface;
heating the portion of said wall adjacent to said opening to a molten state; and
forcing said plug into said opening to an extent sufficient so that said wall engages and fills said annular groove thereby providing a pair of integral flanges on said plug engaging each of the opposite sides of said wall adjacent to said opening, whereby said plug and said wall, when cooled, cooperate to provide a minute passageway between opposite sides of said wall.

14. A method of making a leak structure for a liquid junction of a salt bridge tube and the like, including the steps of:
providing a wall of nonconductive material having an opening therein;
providing a plug of nonconductive material having essentially the same coefficient of thermal expansion as the material of said wall, said plug being larger than said opening;
heating the portion of said wall adjacent to said opening to a molten state;
providing a film on said groove in said plug, said film being of a substance capable of preventing the fusion of said plug to said molten wall; and
forcing said plug into said opening whereby said plug and said wall, when cooled, cooperate to provide a minute passageway between opposite sides of said wall.

15. A method of making a leak structure of a salt bridge tube and the like, including the steps of:
providing a tube of nonconductive material having a passage therethrough, said passage having an annular groove therein adjacent one end of said tube and a restriction behind said groove;
providing a gob of molten nonconductive material having essentially the same coefficient of thermal expansion as the material of said tube, said gob being larger than the cross-section of said passage;
forcing said gob into said passage to form a plug filling said groove and said passage between said restriction and said one end of said tube whereby said plug and said tube, when cooled, cooperate to provide a minute passageway through said tube.

16. A method as set forth in claim 15 including the additional step of providing a film in said passage of a substance capable of preventing fusion of said tube to said gob prior to forcing said gob into said tube.

17. A method as set forth in claim 15 including the additional step of disposing a plastic film over said one end of said tube prior to forcing said gob into said tube.

18. A method of making a leak structure of a salt bridge tube and the like, including the steps of:
providing a first tube of nonconductive material having a passage therethrough, said passage having an annular groove therein adjacent one end of said tube and a restriction behind said groove;
providing a second tube of nonconductive material having essentially the same coefficient of thermal expansion as the material of said first tube, said second tube being closed at one end and having a cross-section less than that of said passage in said first tube;
heating a portion of said second tube adjacent said one end to a molten state;
inserting said molten portion of said second tube into said passage of said first tube so that said one end of said second tube abuts said restriction; and
forcing fluid into the other end of said second tube to expand the molten portion thereof against the walls of said passage whereby said molten portion of said second tube and said first tube, when cooled, cooperate to provide a minute passageway through said first tube.

References Cited

UNITED STATES PATENTS

| | | | |
|---|---|---|---|
| 2,058,761 | 10/1936 | Beckman et al. | 204—195.1 |
| 2,345,498 | 3/1944 | Perley | 204—195 |
| 2,387,727 | 10/1945 | Godshalk | 204—195.1 |
| 2,927,887 | 3/1960 | Proctor | 204—195 |
| 3,152,057 | 10/1964 | Conger et al. | 204—195 |
| 3,266,526 | 8/1966 | Berg | 65—36 |
| 3,298,944 | 1/1967 | Luck | 204—195 |

JOHN H. MACK, Primary Examiner.

T. TUNG, Assistant Examiner.

U.S. Cl. X.R.

65—36, 46